United States Patent
Snider

[11] Patent Number: 5,829,765
[45] Date of Patent: Nov. 3, 1998

[54] FOLDING DOLLY

[76] Inventor: Charles Edward Snider, 35 Widdicomb Hill, Apt. #405, Etobicoke, Ontario, Canada, M9R 1B2

[21] Appl. No.: 915,674

[22] Filed: Aug. 21, 1997

[51] Int. Cl.$^6$ ........................................................ B62B 3/04
[52] U.S. Cl. .............................. 280/42; 280/651; 280/659; 280/47.34
[58] Field of Search ................................. 280/651, 47.18, 280/659, 42, 47.34, 47.35

[56] References Cited

U.S. PATENT DOCUMENTS

| | | | |
|---|---|---|---|
| 4,109,926 | 8/1978 | Lane | 280/651 |
| 4,126,324 | 11/1978 | Browning | 280/42 |
| 4,619,964 | 10/1986 | Hwang | 280/42 |
| 5,040,809 | 8/1991 | Yang | 280/651 |

*Primary Examiner*—Richard M. Camby

[57] ABSTRACT

The present invention provides a dolly comprising a folding frame and a removable platform. The folding frame has front and rear ends and consists of a pair of longitudinal side members having front and rear ends. Wheels are provided at the front and rear ends of each of said side members. A front cross member is hingedly attached to the front ends of said side members and a rear cross member hingedly attached to the rear ends or said side members. Each of said front and rear cross members comprises a left end portion and a right end portion that are pivotally connected to permit said front and rear cross members to fold between said side members. A locking means is preferably provided to lock said left and right end portions of said front and rear cross members in an unfolded position when the dolly is in use. The platform is adapted to fold into a compact bundle for transportation or storage. The platform preferably consists of two or more removable panels hingedly connected to allow the panels to be folded on each other.

6 Claims, 5 Drawing Sheets

FOLDING DOLLY

BACKGROUND OF THE INVENTION

1. Field of the Invention

This invention relates to the movement of goods and more specifically to a hand drawn cart or dolly. The dolly of the present invention can be dismantled into readily portable components but is sturdy enough that heavy loads can be carried on it over relatively uneven surfaces.

2. Description of the Prior Art

Available carrying devices of adequate strength are commonly heavy and difficult to handle, or if lighter, lack the necessary framing for stiffness and durability. The size of wheels is a key factor in the ability to negotiate uneven surfaces and larger wheels which are necessary to facilitate this, require a substantial frame to provide a secure mounting. Fixed frame units with large wheels are heavy and bulky, while lighter non-framed dollies lack durability.

Currently available convertible type porter's trolley/dollies with steel framing are suitable for large items such as suitcases or large cartons, but do not provide a flat carrying platform for smaller items.

SUMMARY OF THE INVENTION

It is an object of the invention to provide a dolly that combines ease of handling and storage with the strength of framed construction.

It is a further object of the present invention to provide a dolly with the carrying flexibility of a flat platform.

It is a further object of the present invention to provide a dolly having large diameter wheels to facilitate negotiating uneven or rough surfaces.

Thus, in accordance with the present invention, there is provided a dolly comprising a folding frame and platform. The folding frame has front and rear ends and consists of a pair of longitudinal side members having front and rear ends. Wheels (arc provided at the front and rear ends of each of said side members. A front cross member is hingedly attached to the front ends of said side members and a rear cross member hingedly attached to the rear ends of said side members. Each of said front and rear cross members comprises a left end portion and a right end portion that are pivotally connected to permit said front and rear cross members to fold between said side members. A locking means is preferably provided to lock said left and right end portions of said front and rear cross members in an unfolded position.

The platform is adapted to fold into a compact bundle for transportation or storage. The platform preferably consists of two or more removable panels hingedly connected to allow the panels to be folded on each other.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
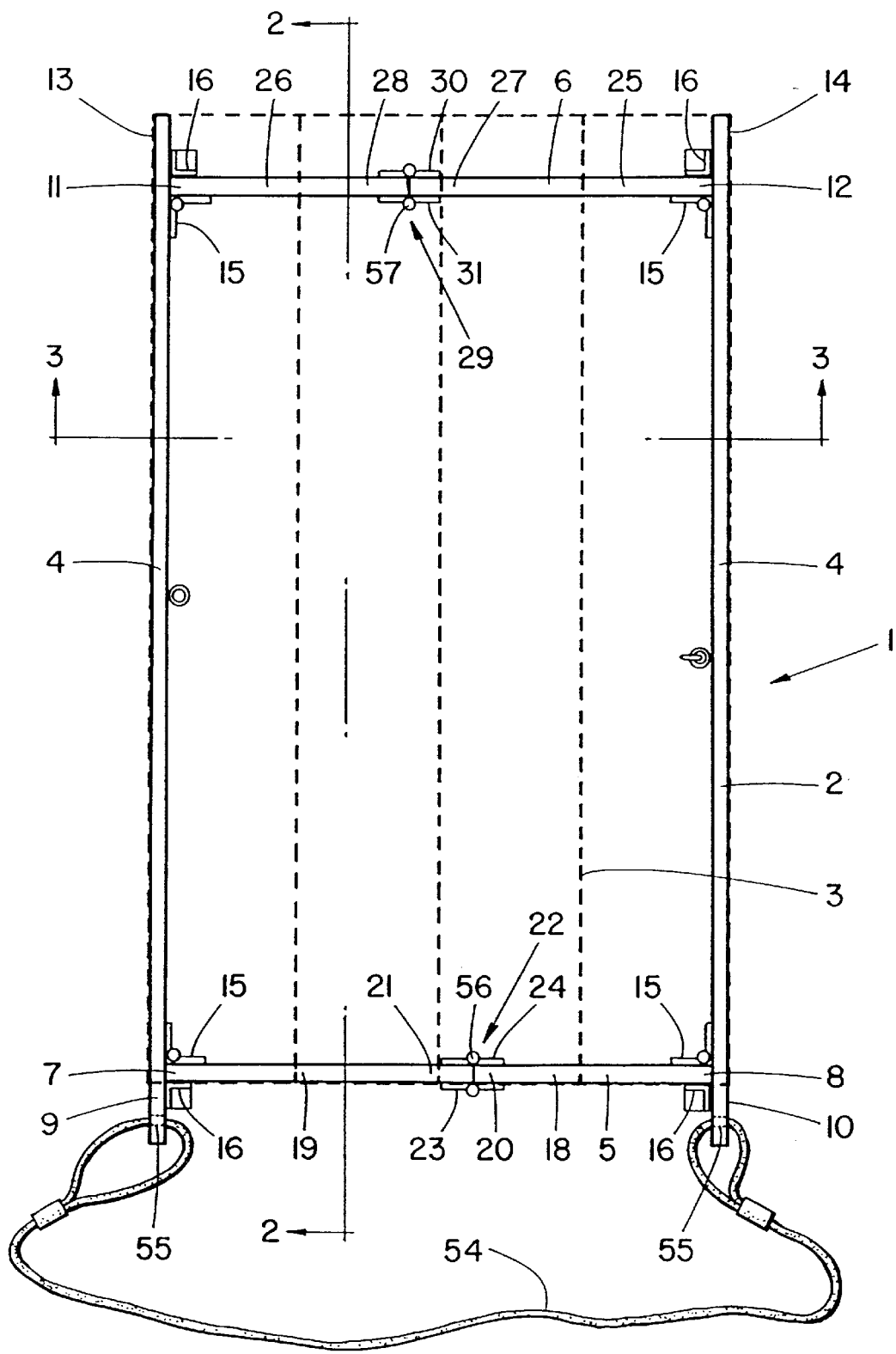
FIG. 1 is a top plan view of the dolly of the present invention.
Figure 2:
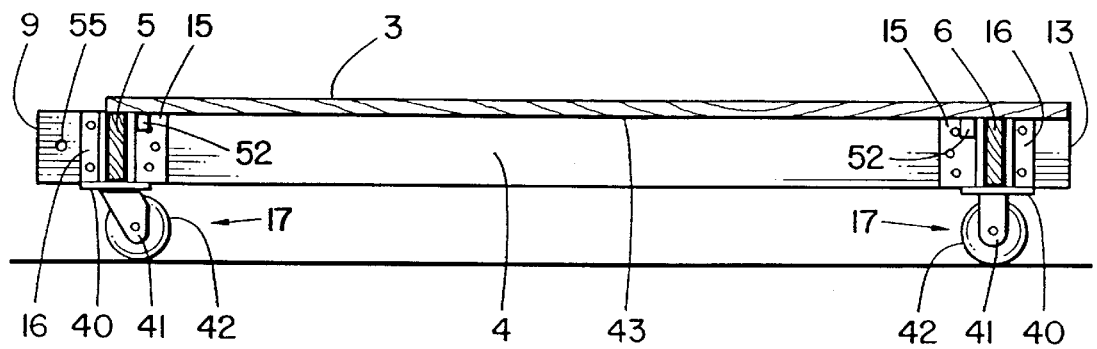
FIG. 2 is cross sectional view of the dolly of FIG. 1 along line A—A.
Figure 3:
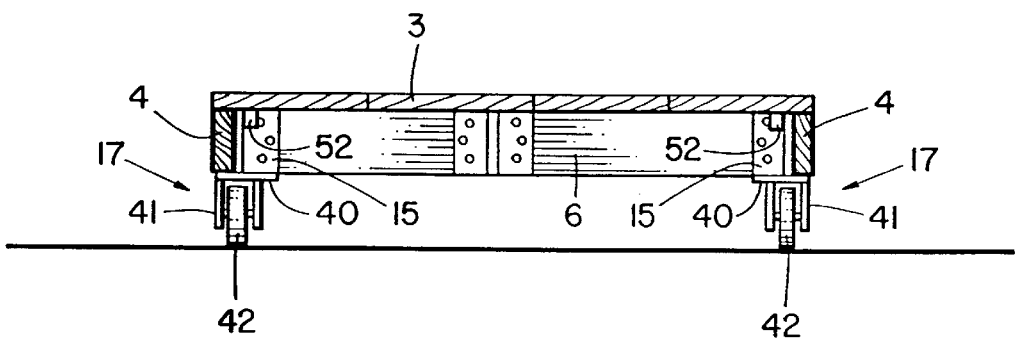
FIG. 3 is cross sectional view of the dolly of FIG. 1 along line B—B.

Referring to FIGS. 1 to 7, a dolly according to the present invention is generally indicated at 1 and comprises a folding frame 2 and a platform 3. The frame 2 consists of two longitudinal side members 4 and a front cross member 5 and rear cross member 6. The ends 7,8 of front cross member 5 are hingedly connected to one of the ends 9,10 of each of said longitudinal side members 4. The ends 11, 12 of rear cross member 6 are hingedly connected to the other one of the ends 13, 14 of each of said longitudinal side members 4. In the preferred embodiment shown in the drawings the connections of the front cross member 5, and rear cross member 6 to the side members 4 are effected with hinges 15 and each joint is braced with a steel angle 16.

The frame 2 is further provided with wheel assemblies 17 which in the preferred embodiment are anchored to the underside 43 of the frame 2 by welding to the steel angles 16. The wheel assemblies 17 are preferably a caster type construction having an upper horizontal steel plate 40 to facilitate attachment at each corner of the frame 2. Depending flanges 41 are connected to one side of the steel plate 40 and wheel 42 is mounted between these flanges 41. The steel plate 40 in the preferred embodiment is welded to the steel angle 16 and angle 16 through bolted to the side members 4 to both stiffen the hinged joints and to securely anchor the wheel assemblies 17. The wheel assemblies 17 at the front of the dolly are preferably of the swivel caster type to permit steering while those in the rear are fixed in their direction to permit directional control.

The front cross member 5 consists of a left end portion 18 and a right end portion 19. The left end portion 18 and right end portion 19 are unequal in length. The interior ends 20, 21 of said left end portion 18 and said right end portion 19 are pivotally connected and locking means 22 are provided to lock the left and right end portions in position. In the preferred embodiment the left and right end portions 18, 19 are connected by hinge 23 which permits the front cross member 5 to fold between said side members 4. The locking means 22 illustrated in the preferred embodiment consists of a second hinge 24 attached the opposite side of the left and right end portions 18, 19 from hinge 23. The left and right end portions 18, 19 of front cross member S can be locked in the open position (end to end) by inserting the pin 56 into hinge 24 which together with the hinge 23 creates a rigid joint, and also gives strength to the front cross member.

Similarly the rear cross member 6 consists of a left end portion 25 and a right end portion 26. The left end portion 25 and right end portion 26 are unequal in length. The interior ends 27, 28 of said left end portion 25 and said right end portion 26 are pivotally connected and locking means 29 are provided to lock the left and right end portions in position. In the preferred embodiment the left and right end portions 25, 26 are connected by hinge 30 which permits the rear cross member 6 to fold between said side members 4. The locking means 29 illustrated in the preferred embodiment consists of a second hinge 31 attached the opposite side of the left and right end portions 25, 26 from hinge 30. The left and right end portions 25, 26 of rear cross member 6 can be locked in the open position (end to end) by inserting the pin 57 into hinge 31 which together with the hinge 30 creates a rigid joint, and also gives strength to the rear cross member.

The intermediate hinged joints of each of the front and rear cross members of the frame is preferably offset so that when folded the wheel assemblies 17 nest to provide the most compact unit for storage.

Figure 4:
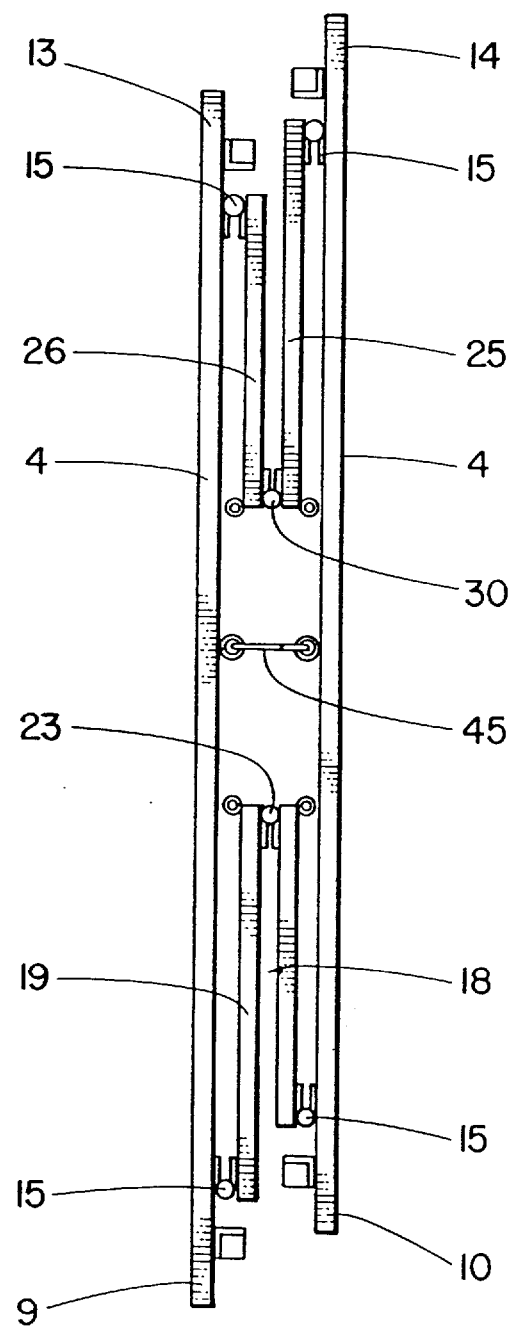
FIG. 4 is top plan view of the dolly of FIG. 1 in a folded condition.
Figure 5:
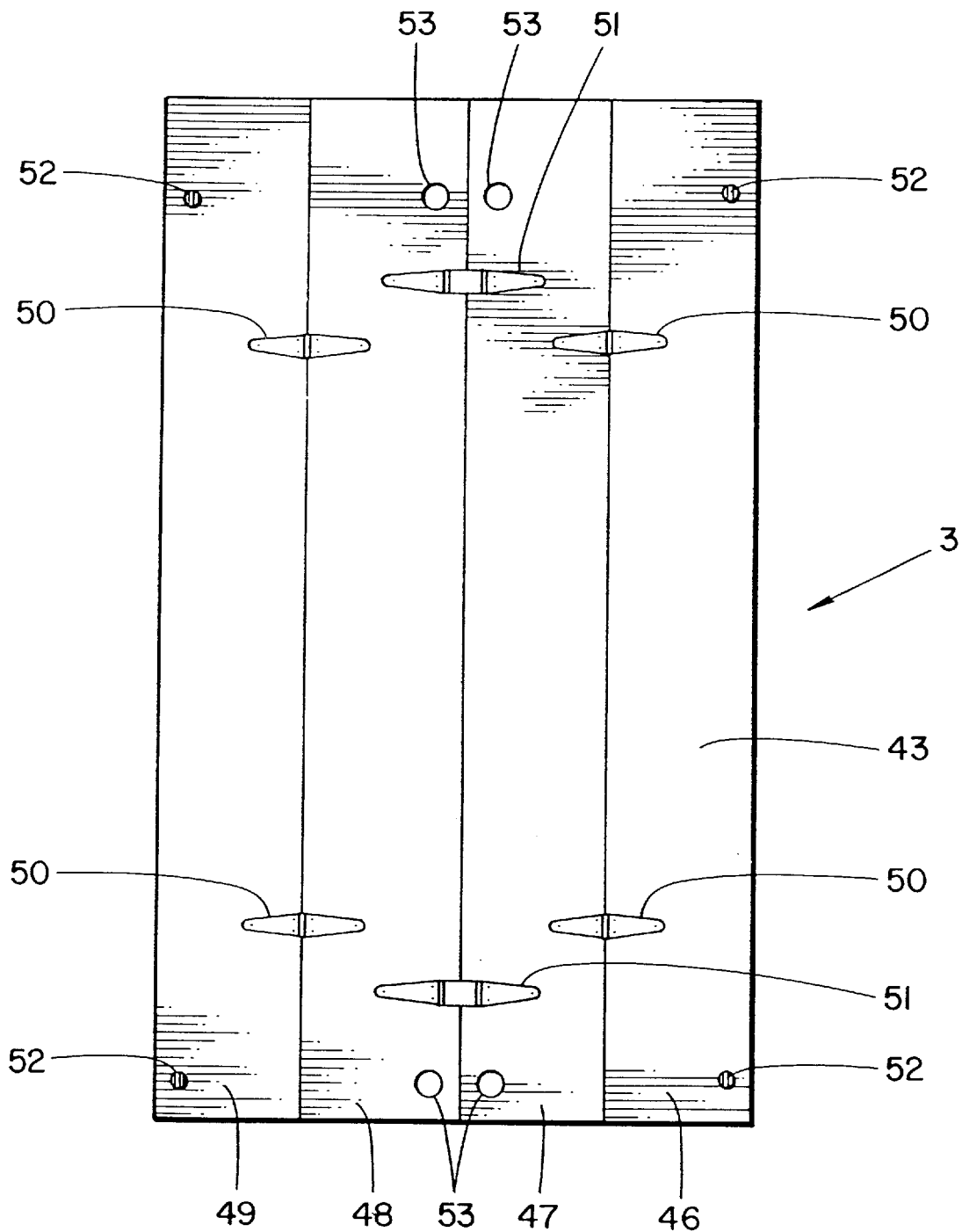
FIG. 5 is a bottom plan view of the platform of the dolly of FIG. 1
Figure 6:
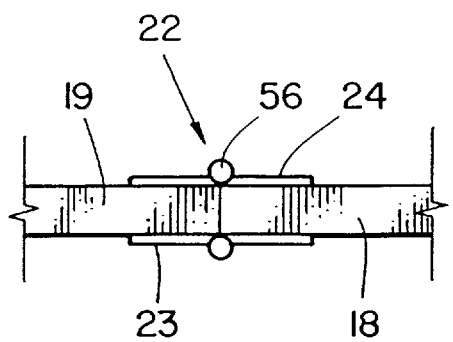
FIG. 6 is a top plan view of the hinged connection of the front cross member of the dolly of FIG. 1.
Figure 7:
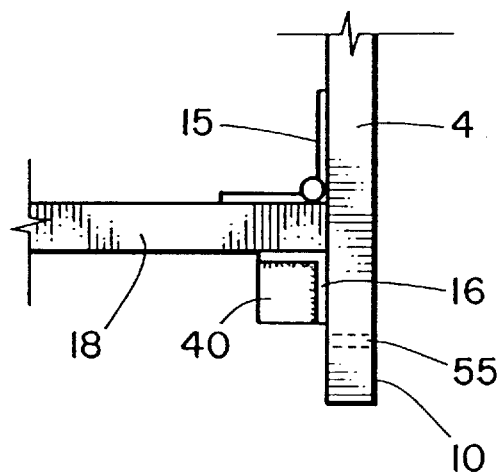
FIG. 7 is a top plan view of a hinged connection of the front or rear cross member to a side member of the dolly of FIG. 1
Figure 8:
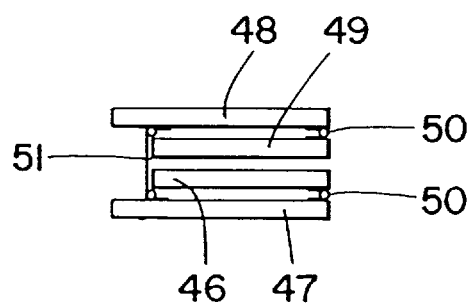
FIG. 8 is an end plan view of the platform of FIG. 5 in a folded position.

A hook and eye 45 is provided at the mid point of side members 4 of the frame 2 to lock the frame in its closed position as shown in FIG. 4.

The platform 3 is adapted to permit folding into a compact bundle. In the preferred embodiment the platform 3 consists of four equal sized removable panels 46,47,48 49 approximately the same length as the side members 4 of frame 2. The panels 46,47 and 48,49 are connected on their underside by hinges 50 so that the outer panels 46 and 49 fold in on the inner panels 47 and 48 respectively. Panels 47 and 48 are connected on their underside by double jointed hinges 51 so that the panels 47 and 48 fold on themselves to enclose the previously folded panels 46 and 49.

On the underside 43 of the platform 3, in each corner a dowel 52 is attached to the underside, so that when the platform 3 is placed on the erected frame 2 it is positively located and the frame is held rigidly in its correct alignment. Matching holes 53 are provide in the inner panels 47 and 48 to accommodate the dowels 52 when the panels are folded into their carrying position.

A handle means can be attached to the front of the frame so that the dolly can be pulled or pushed. In the preferred embodiment the handle means consists of a rope 54 attached to the front ends 9,10 of each of said side members 4 through holes 55.

In the preferred embodiment the frame 2 is fabricated from 1"×3" wooden pieces. The side members 4 are approximately 4'3" and the front and rear cross members 5, 6 are approximately 2"6" in length. The platform panels are approximately 4' in length and 8" wide. The frame and platform can be manufactured of any suitable material as an alternative to the wood used in the disclosed embodiment that provides durability, strength and light weight such as plastics or metals and may be of solid or tubular construction.

It will be appreciated that the above description related to the preferred embodiment by way of example only. A locking device to hold the platform sections in their closed position and carrying handles or grips could be provided to facilitate carrying each of the folded sections. If desired fastenings could be installed to permanently attach the platform to one side of the frame and facilitate folding of the platform panels around the frame to provide one compact bundle. It is also feasible to attach the locking pins to the frame with lengths of wire or chain to ensure they do not become mislaid, and these wires/chains would also be of assistance in removing the pins when dismantling the dolly. Many variations on the invention will be obvious to those knowledgeable in the field, and such obvious variations are within the scope of the invention as described and claimed. Whether or not expressly described.

What is claimed as the invention is:

1. A dolly comprising a folding frame and a platform, said folding frame having front and rear ends and consisting of a pair of longitudinal side members having front and rear ends, wheels provided at the front and rear ends of each of said side members, a front cross member hingedly attached to the front ends of said side members and a rear cross member hingedly attached to the rear ends of said side members wherein each of said front and rear cross members comprises a left end portion and a right end portion said left and right end portions pivotally connected by a first hinge to permit said front and rear cross members to fold between said side members, and locking means consisting of a second hinge attached to said left and right end portions on the opposite side of said left and right end portions from said first hinge and said second hinge having a removable pin to lock said left and right end portions of said front and rear cross members in an unfolded position.

2. A dolly according to claim 1 further comprising handle means.

3. A dolly according to claim 1 wherein said platform is adapted to fold into a compact bundle for transportation or storage.

4. A dolly according to claim 2 wherein said platform consists of two or more removable panels hingedly connected to allow the panels to be folded on each other.

5. A dolly according to claim 2 wherein said handle means comprises a rope attached to the front ends of said side members.

6. A dolly according to claim 5 wherein said wheels are of caster type construction.

* * * * *